(12) United States Patent
Shin et al.

(10) Patent No.: US 6,679,421 B2
(45) Date of Patent: Jan. 20, 2004

(54) INTEGRATED CUSTOMER MANAGEMENT SYSTEM AND METHOD USING WIRELESS BARCODE

(75) Inventors: Young-Cheol Shin, Seoul (KR); Chang-Hwan Oh, Daejeon (KR); Hyuck-Jin Gwon, Daejeon (KR); Doo-Seop Eom, Daejeon (KR)

(73) Assignee: Secubay Corporation (KR)

( * ) Notice: Subject to any disclaimer, the term of this patent is extended or adjusted under 35 U.S.C. 154(b) by 155 days.

(21) Appl. No.: 09/968,160

(22) Filed: Oct. 1, 2001

(65) Prior Publication Data

US 2002/0040341 A1 Apr. 4, 2002

(30) Foreign Application Priority Data

Sep. 29, 2000 (KR) ......................................... 2000-57214

(51) Int. Cl.[7] .............................................. G06F 17/00
(52) U.S. Cl. ........................ 235/375; 235/380; 235/381; 235/382; 902/22
(58) Field of Search ................................. 235/375, 380, 235/381, 382, 462.05; 902/22; 705/10, 11, 14, 26, 27

(56) References Cited

U.S. PATENT DOCUMENTS

| | | | | |
|---|---|---|---|---|
| 5,450,491 A | * | 9/1995 | McNair | ...................... 713/184 |
| 5,592,560 A | * | 1/1997 | Deaton et al. | ............... 382/100 |
| 5,905,248 A | * | 5/1999 | Russell et al. | ......... 235/462.15 |
| 5,939,699 A | * | 8/1999 | Perttunen et al. | ...... 235/462.01 |
| 5,950,173 A | * | 9/1999 | Perkowski | .................... 705/26 |
| 6,247,000 B1 | | 6/2001 | Hawkins et al. | |
| 6,525,698 B1 | * | 2/2003 | Takechi et al. | ............... 345/1.2 |
| 2002/0059147 A1 | * | 5/2002 | Ogasawara | ................... 705/70 |
| 2002/0065728 A1 | * | 5/2002 | Ogasawara | ................... 705/23 |

FOREIGN PATENT DOCUMENTS

JP         04033188 A    *  2/1992    ..........  G06K/19/06

OTHER PUBLICATIONS

Liquid Crystal Diode Bar Code Unit, IBM Technical Disclosure Bulletin, Dec. 1990, vol. 33, No. 7, pp. 363–365.*

* cited by examiner

Primary Examiner—Michael G. Lee
Assistant Examiner—Kimberly Nguyen
(74) Attorney, Agent, or Firm—Webb Ziesenheim Logsdon Orkin & Hanson, P.C.

(57) ABSTRACT

A customer management system and method using an LCD barcode displayed on a mobile terminal. The present invention is simply and conveniently identifies customers using commodity barcodes being widely used and customer information barcodes on cellular phones, realizing effective marketing at minimum cost according to the purchase propensities or preferences of the customers for commodities and rapidly provides the customers with a variety of commodity information and a variety of benefits based on the results of their barcode use at any place, thereby effectively managing the customers integratedly.

5 Claims, 2 Drawing Sheets

INTEGRATED CUSTOMER MANAGEMENT SYSTEM AND METHOD USING WIRELESS BARCODE

BACKGROUND OF THE INVENTION

1. Field of the Invention

The present invention relates in general to an integrated customer management system and method using an LCD barcode displayed on a mobile terminal (mobile phone such as cellular phone, PDA, and pager, etc.), and more particularly to a customer management system and method which can simply and conveniently identify customers using both commodity barcodes being widely used and customer information barcodes on cellular phones, realize effective marketing at minimum cost according to the purchase propensities or preferences of the customers for commodities, and rapidly provide the customers with a variety of commodity information and a variety of benefits based on the results of their barcode usage at any place, thereby effectively managing the customers integratedly.

2. Description of the Prior Art

Conventional customer management systems have managed customers using customer management cards in the form of a magnetic card or paper. In the case where a customer is given a customer management card in the form of paper, a customer manager records the purchase contents of the customer on his or her card and provides the customer with benefits based on the results of his or her card usage, so as to induce the purchase motive of the customer. For example, a beauty salon may record the purchase contents of a customer on his or her customer management card each time he or she receives a beauty treatment service, and provide the customer with the beauty treatment service free of charge once he or she has received the beauty treatment service ten times. Customer management cards in the form of a magnetic card are used in a similar manner to those in the form of paper and may be typical cards frequently used, such as refueling station customer management cards, department store customer management cards and the like. Coupons that fast food houses, refueling stations, etc. distribute to customers may also be interpreted to be a kind of customer management card in the general sense.

The above-mentioned conventional customer management systems have the following disadvantages.

Firstly, it is inconvenient for users to carry customer management cards. Recently, the number of eating houses, entertainment establishments, department stores, etc. employing customer management cards as customer invitation means is on a rapidly increasing trend, resulting in a flood of various customer management cards. Moreover, it is current reality that a variety of credit cards and transport cards (subway and bus cards) are present in addition to such customer management cards. As a result, it is illogical to expect users to carry such customer management cards individually. Furthermore, most users often handle such customer management cards with little importance and are thus liable to lose them. This trend is shown more in men than women because men have a relatively weak sense of economy as compared with women. In conclusion, although customer management cards are good means capable of inviting a larger number of customers, they cannot realize so satisfactory results as expected.

Secondly, the conventional customer management systems are not efficiently linked with a point-of-sales (POS) system that inputs records of customer usages and calculates the amount of money to be paid by the customers on the basis of the inputted records. In other words, the conventional customer management systems are operated independently of the POS system although they are in close connection with the POS system. Provided that the conventional customer management systems are efficiently linked with the POS system, they will be able to readily analyze the purchase propensities or preferences of customers for commodities and systematically and effectively manage the customers on the basis of the analyzed results. At any rate, it is current reality that the conventional customer management systems manage customers in such a simple and primitive manner that, for example, as seen in most department stores, the customers present receipts for commodities purchased in a day, and employees of the department stores check the presented receipts one by one and offer premiums corresponding to the total purchasing prices respectively to the customers.

SUMMARY OF THE INVENTION

Therefore, the present invention has been made in view of the above problems, and it is an object of the present invention to provide an integrated customer management system wherein barcodes for individual identification can be displayed on cellular phones considered to be always carried by customers, thereby overcoming the problems with conventional customer management cards, or the inconvenience of carrying them and the risk of losing them, and barcodes employed in most POS systems can be utilized as customer identification means and means for providing specific benefits to predominant customers (e.g., electronic coupons using barcodes), thereby enabling the efficient linking with the PSO systems.

In accordance with the present invention, the above and other objects can be accomplished by providing a customer management system using an LCD barcode displayed on a mobile terminal comprising wireless barcode scanners for recognizing the barcodes corresponding to customer information and commodity information; a plurality of customer servers for receiving the customer information and commodity information from the barcode scanner, extracting personal details of customers from the received customer information, analyzing commodity purchase information of the customers and their purchase propensities or preferences for commodities, storing the analyzed results and sending the customer information, the commodity purchase information of the customers and information regarding the purchase propensities or preferences of the customers for commodities to a central management server; and the central management server adapted to receive and store the information sent from the customer servers, share information with the customer servers and retrieve desired information from a given one of the customer servers.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
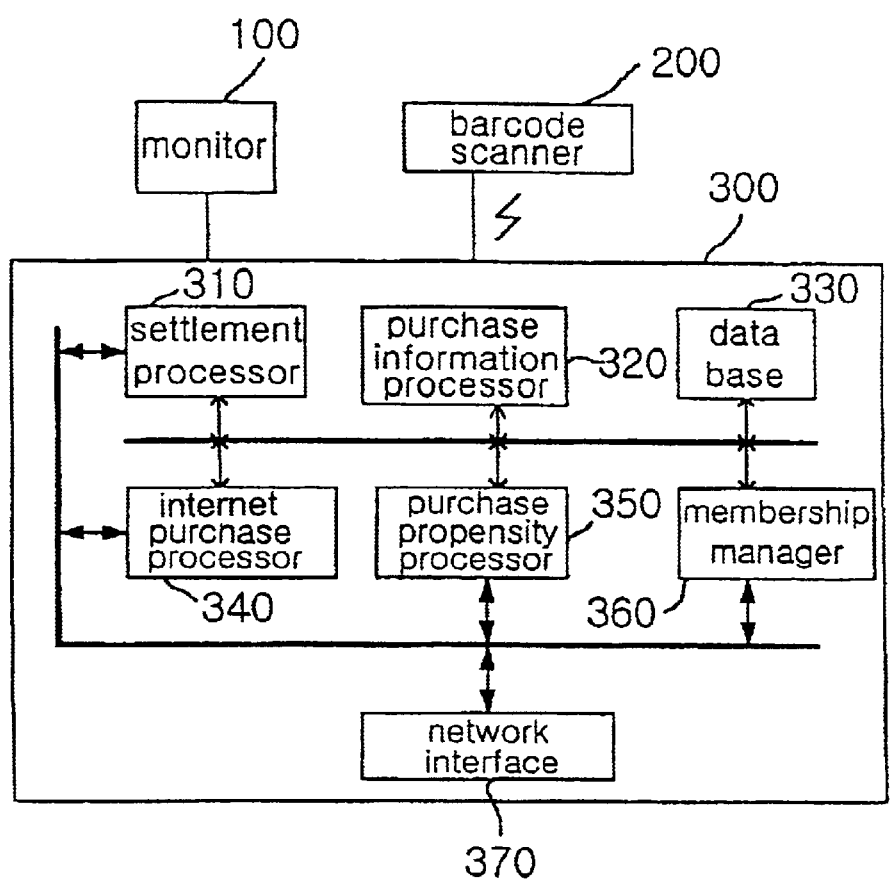
FIG. 1 is a block diagram showing the construction of a customer management system in accordance with the present invention.

FIG. 1 is a block diagram showing the construction of a customer management system in accordance with the present invention. As shown in this drawing, the customer management system comprises a customer server 300 including a membership manager 360 for managing all matters in membership registration and withdrawal of customers with reference to information stored in a database 330. The customer server 300 further includes a settlement processor 310 for determining from a membership number of a given one of the customers whether a credit card of the given customer has been authenticated, transferring records containing the membership number of the customer and the total amount of money to be paid by the customer, to a credit card company associated with the credit card of the customer upon determining that the credit card has been authenticated, and requesting the credit card company to settle its account for the amount of money to be paid by the customer. A purchase information processor 320 is also provided in the customer server 300 to extract personal information of the given customer and information regarding a commodity or commodities purchased by the customer from barcode data from wireless barcode scanners 200, calculate the price of each of the commodities purchased by the customer and the total amount of money to be paid by the customer and transfer the calculated results to components in the customer server 300, which require them. An Internet purchase processor 340 is further provided in the customer server 300 to transfer the personal information of the given customer and the information regarding the commodity or commodities purchased by the customer to the purchase information processor 320 over Internet. A purchase propensity processor 350 is further provided in the customer server 300 to receive the information regarding the commodity or commodities purchased by the given customer from the purchase information processor 320, statistically process the received information and analyze commodity purchase information of the given customer and his or her purchase propensity or preference for commodities in accordance with the processed results. The database 330 is adapted to store information regarding personal details of the customers, the total amounts of money to be paid by the customers, the purchase propensities or preferences of the customers for commodities, settlement records of the customers, and commodities and coupons to be delivered to the customers. A network interface 370 is also provided in the customer server 300 to interface the above components in the customer server 300 to a communication network.

Figure 2:
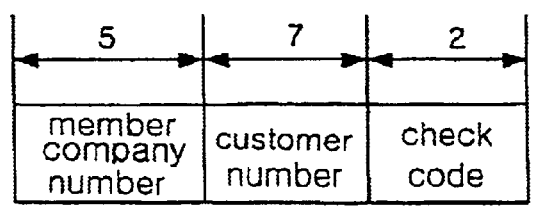
FIG. 2 is a view showing a format of a barcode applied to the present invention.

FIG. 2 is a view showing a format of a barcode applied to the present invention. Although the barcode has a one-dimensional format for the convenience of implementation in the present embodiment, it is essential that the barcode is not limited in format. As shown in FIG. 2, the barcode applied to the present invention may preferably be composed of fourteen decimal digits. The first five decimal digits constitute membership company numbers used to distinguish companies registered as members of the present invention from one another. The subsequent seven decimal digits constitute customer numbers used to distinguish customers registered as members of each membership company from one another. Notably, in the case where membership companies are concerned with a theater, concert hall, playing ground and other places employing tickets, customer numbers may signify ticket numbers. Alternatively, in the case where membership companies are a department store, fast food house, beauty salon, a large-scale supermarket, etc., each of them may reserve specific digits of each customer number for use of coupons.

For example, the last two digits of each customer number, constituting up to 100 numbers, may be used for coupons instead of customer identification. In this case, first, a barcode with a format of (membership company number+customer identification number+check code) is displayed on a display window of a cellular phone of each customer and read by the barcode scanner for customer identification. Then, a coupon desired by each customer is displayed on the display window of the cellular phone thereof in the form of a barcode with a format of (membership company number+coupon identification number+check code). This displayed barcode is read by the barcode scanner for coupon identification.

In the above case, each customer may receive discount benefits corresponding to the number of used coupons. This case is but one example of barcode use, and the membership companies can manage customers using barcodes of various formats, including electronic tickets, coupons, etc.

Figure 3:
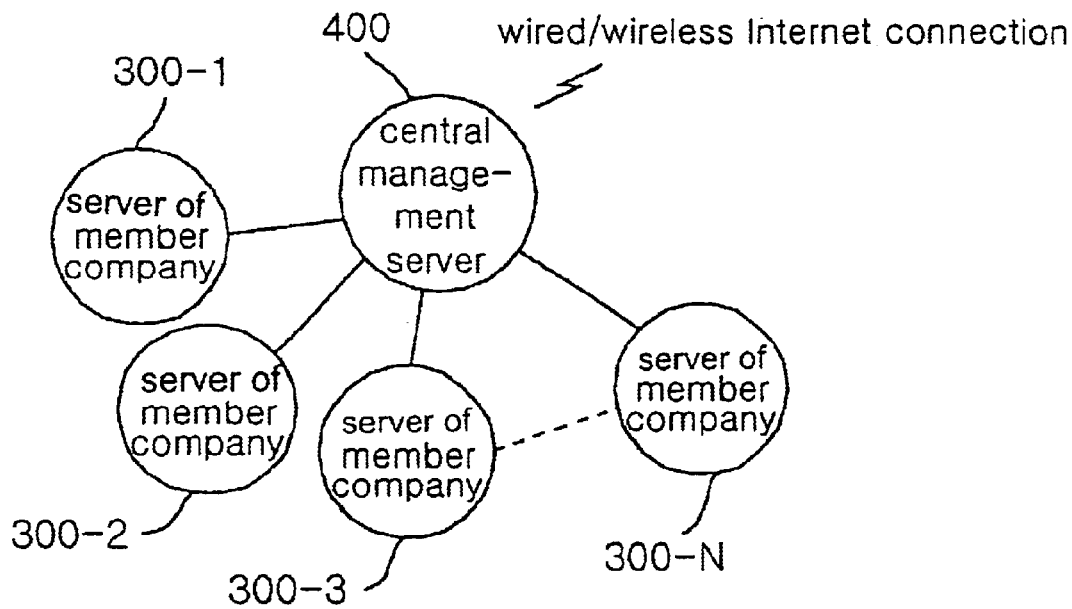
FIG. 3 is a view showing a network architecture to which the customer management system according to the present invention is applied.

FIG. 3 is a view showing a network architecture to which the customer management system according to the present invention is applied. As shown in this drawing, the customer server 300 is connected to a central management server 400 via a communication network such as Internet. The central management server 400 receives and stores information from the customer server 300. In the preferred embodiment of the present invention, the central management server 400 may share information with a plurality of customer servers and retrieve desired information from a given one of the customer servers.

Figure 4:
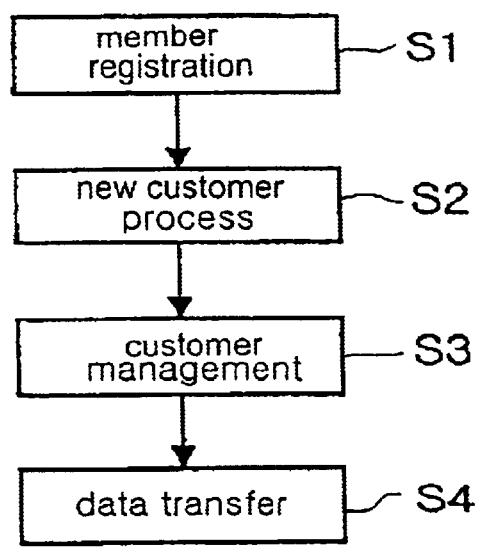
FIG. 4 is a flowchart illustrating a customer management method in accordance with the present invention.

FIG. 4 is a flowchart illustrating a customer management method in accordance with the present invention.

Now, a detailed description will be given of the operation of the customer management system with the above-stated construction in accordance with the present invention with reference to the accompanying drawings.

First, a user gains access to the central management server 400 and registers as a member of the server 400 at step S1. At step S2, if the user is a new customer, not registered, the customer server 300 inquires of the central management server 400 about information regarding the user (for example, a barcode number assigned to the user when registering as a member of the server 400), and then receives the inquired information from the central management server 400.

If the user is or becomes a registered customer, the customer server 300 performs customer management operations such as a purchase information process, purchase propensity process, etc. at step S3, which will hereinafter be described in detail.

The customer server 300 receives customer identification information and commodity purchase information from the wireless barcode scanners 200. The customer identification information is obtained by reading a barcode recorded on a personal identification card by the barcode scanner 200. Each customer can simply and conveniently be identified by replacing the barcode recorded on the personal identification card with a barcode displayed on a cellular phone of each customer. The commodity purchase information is obtained by reading a barcode marked on the packing paper of a commodity purchased by each customer, by the barcode scanner 200.

The wireless barcode scanners 200 preferably functions to recognize a barcode displayed on the cellular phone as well as a barcode printed on the paper. Through investigations and experiments, it could be seen that, all over the world, there is no barcode scanner capable of stably recognizing the barcode displayed on the cellular phone. In the present embodiment, the barcode scanner 200 transfers the read barcode data to the customer server 300 in a wireless manner (based on a wireless local area network (LAN) or Bluetooth) or a wired manner based on an RS232C cable. Although not shown in FIG. 1, a barcode recognition software module provided in the customer server 300 recognizes the barcode data (image data) transferred from the barcode scanner 200 and converts it into a numeral or character format. Here, the barcode is used for recognition of an associated customer or recognition of a coupon in a barcode form.

The following example shows the general use of the barcode as shown in FIG. 2 according to the present invention.

For example, a customer may purchase a desired commodity in a large-scale supermarket and pay a purchasing price of the commodity over the counter at the supermarket. At this time, the customer presents his cellular phone with a barcode displayed thereon to a clerk, which then scans the displayed barcode with the barcode scanner and thus identifies the customer. Thereafter, the clerk scans a barcode attached to the commodity purchased by the customer, with the barcode scanner. Therefore, the customer server 300 can recognize who the customer is and what commodity is purchased.

The purchase information processor 320 converts barcode data from the barcode scanner 200 into a character or numeral format and extracts personal information of a given customer and information regarding a commodity or commodities purchased by the customer from the converted character or numeral format. The purchase information processor 320 then calculates the price of each commodity purchased by the customer and the total amount of money to be paid by the customer. At this time, the total amount of money to be paid by the customer is calculated in consideration of coupons in a barcode form displayed on a cellular phone of the customer and his or her accumulated purchase points. That is, the customer is given discount benefits if he or she has coupons or predetermined purchase points. Further, the purchase information processor 320 transfers the personal information of the given customer and the information regarding the commodity or commodities purchased by the customer and the total amount of money to be paid by the customer to the settlement processor 310, purchase propensity processor 350 and membership manager 360.

The database 330 is interfaced with the respective components in the customer server 300 to store information regarding personal details of customers, the total amounts of money to be paid by the customers, the purchase propensities or preferences of the customers for commodities, settlement records of the customers, and commodities and coupons to be delivered to the customers.

The purchase propensity processor 350 receives information regarding commodities purchased by customers from the purchase information processor 320, statistically processes the received information and analyzes the purchase propensities or preferences of the customers for commodities in accordance with the processed results. Further, the purchase propensity processor 350 obtains a variety of information available for marketing, such as the regional distribution and age distribution of the customers, the popularity distribution and point-of-sales distribution of the commodities, etc. by statistically processing the information transferred from the purchase information processor 320.

On the basis of the information analyzed and obtained in the above manner, the purchase propensity processor 350 provides commodity information, sales information, coupons, etc. selectively to only desired customers via the network interface 370. Moreover, the purchase propensity processor 350 assigns a customer purchasing a commodity purchase points proportional to a purchasing price of the commodity. If the accumulated purchase points of the customer reach a predetermined value, then the purchase propensity processor 350 provides discount benefits or premiums to the customer so as to induce the purchase motive of the customer.

The membership manager 360 manages all matters in membership registration and withdrawal of customers. Personal information of customers registered as members are stored in the database 330 and then managed by the membership manager 360.

The settlement processor 310 is operable only when a customer purchasing a commodity desires to pay a purchasing price of the commodity by his or her credit card. In operation, the settlement processor 310 receives information regarding the total amount of money to be paid by the customer and customer identification information (e.g., a membership number of the customer) from the purchase information processor 320. Then, a clerk receives a credit card from the customer and transfers information regarding the received credit card to the customer server 300 through, for example, a keyboard. At this time, the settlement processor 310 transfers the membership number of the customer to the database 330 to determine whether the credit card of the customer is valid. Upon determining that the credit card of the customer is valid, the settlement processor 310 transfers, to a credit card company associated with the credit card, records containing the membership number of the customer (or information available for customer identification by the credit card company, such as a resident registration number) and the total amount of money to be paid by the customer through the network interface 370 and requests the credit card company to settle its account for the amount of money to be paid by the customer.

In this procedure, a password of the customer is required in the same manner as the traditional credit card settlement for the purpose of preventing the credit card from misusing.

As described above, a customer using a credit card can conduct all requirements attendant on commodity purchase at a time by merely presenting a cellular phone with a barcode displayed thereon. The convenience of the present invention will be able to be estimated from, for example, purchase actions in a food section of an existing large-scale supermarket or department store. For customers having no cellular phone, customer identification cards with barcodes marked thereon may be provided. Such a customer identification card may be shaped as, for example, a key chain (made by coating a transparent plastic material on a printed barcode) or sticker made convenient to carry. Settlement records of customers may be stored in the database 330 as needed.

Internet purchase processor 340 enables online sales over Internet as well as offline sales. Customers can purchase desired commodities over a communication network such as Internet. For purchase over Internet, there is no barcode used, but the remaining procedure is processed in the same manner as offline sales are performed in the purchase information processor 320.

In other words, Internet purchase processor 340 transfers personal information of a given customer and information regarding a commodity or commodities purchased by the customer to the purchase information processor 320 over Internet. Then, in the same manner to the offline sales using a barcode displayed on a cellular phone, the purchase information processor 320 calculates the price of each commodity purchased by the customer and the total amount of money to be paid by the customer on the basis of the information transferred from Internet purchase processor 340. Further, the purchase information processor 320 transfers the personal information of the given customer and the information regarding the commodity or commodities purchased by the customer and the total amount of money to be paid by the customer to the settlement processor 310, purchase propensity processor 350 and membership manager 360.

As a result, the purchase information processor 320 makes no distinction between the offline sales using a barcode displayed on a cellular phone and the online sales over Internet. Similarly, the settlement processor 310, database 330 and membership manager 360 make no distinction between the offline sales and the online sales.

However, the purchase propensity processor 350 acts to collect information about which one of the offline purchase and online purchase is mostly conducted by customers and information regarding offline and online sales amounts by commodities. The reason is that such information can be utilized as important marketing data. To this end, the purchase propensity processor 350 receives desired information from Internet purchase processor 340.

A monitor 340 is used to show a given customer details of commodities purchased, a discounted price resulting from coupons or purchase points and the total amount of money to be paid by the customer, which are transferred from the purchase information processor 320.

The network interface 370 acts to interface the settlement processor 310, Internet purchase processor 340, purchase propensity processor 350 and membership manager 360 to a communication network. The settlement processor 310 is connected to a server of a credit card company via the network interface 370. Internet purchase processor 340 is connected to a wired or wireless Internet network via the network interface 370.

To this end, the network interface 370 functions to interface with the wired or wireless Internet network. The purchase propensity processor 350 transfers desired sales information, commodity information, coupons, etc. to a computer in the home or office of a given customer, or his or her cellular phone or personal digital assistant (PDA) over the wired or wireless Internet network. For a cellular phone having no wireless Internet function, the purchase propensity processor 350 must be able to transfer a character message containing desired sales information, commodity information, coupons, etc. to a given customer. To this end, the network interface 370 has a character message transfer function in addition to the above wired/wireless Internet interface function.

Finally, at step S4, the customer server 300 sends purchase records of the user to the central management server 400. In other words, the customer server 300 acts to collect purchase records of customers for a predetermined period of time and send the collected purchase records to the central management server 400 at a time at intervals of the predetermined time period. Further, the customer server 300 and the central management server 400 exchange other information available for customer management with each other during the night when an associated network is at off-peak hours.

Referring again to FIG. 3, a customer management network comprises the central management server 400 and a plurality of servers in the respective membership companies, or the customer servers 300, connected to the central management server 400 in the form of stars.

With this construction, the central management server 400 can basically manage members belonging to the membership companies in an integrated manner. The central management server 400 acts to manage the amounts of money paid by customers for commodities purchased from the membership companies or services provided therefrom and provide a mileage service to the customers in accordance with the managed money amounts. Namely, the central management server 400 accumulates mileage points corresponding to the amounts of money paid from the customers to the membership companies irrespective of which ones of the membership companies are used by the customers. If the accumulated mileage points reach a predetermined value, then the central management server 400 provides benefits to the corresponding customers.

To this end, the central management server 400 manages customers belonging to the membership companies in an integrated manner and periodically receives information regarding the amounts of money paid by the customers (or mileage points calculated personally by the membership companies) from the customer servers located respectively in the membership companies. Upon receiving the information regarding the amounts of money paid by the customers from the customer servers in the membership companies, the central management server 400 calculates mileage points corresponding to the paid money amounts and adds the calculated mileage points to the previous mileage points of the customers. When receiving the mileage points calculated personally by the membership companies, the central management server 400 merely adds the received mileage points to the previous mileage points of the customers.

The central management server 400 can also be connected to Internet in a wired or wireless manner. As a result, each customer can gain access to the central management server 400 using a PDA or cellular phone as well as a typical computer and register as a member of the server 400 or check his or her own mileage points. For wireless Internet connection, the central management server 400 is connected to a WAP gateway. In this case, the customer server 300 has the construction as shown in FIG. 1, and the network interface 370 in FIG. 1 is connected to the central management server 400.

Industrial Applicability

As apparent from the above description, the present invention has its effects summarized as follows.

Firstly, the use of barcodes enables the customer management system to rapidly and accurately grasp purchase details and propensities of customers through the effective linking with a POS system.

Secondly, the use of cellular phones can overcome the inconvenience of carrying conventional customer management cards.

Thirdly, the use of cellular phones enables the customer management system to rapidly transfer desired information to customers at any place.

Fourthly, effective marketing can be performed on the basis of the information obtained by grasping the purchase propensities of customers to commodities.

Fifthly, the customer management system can be linked with an electronic purchase system over Internet, thereby integratedly managing customers in consideration of both online purchase and offline purchase. Therefore, the present system has superior efficiency over conventional customer management systems which consider only either the offline purchase or online purchase.

Sixthly, electronic coupons are implemented in the form of barcodes displayed on cellular phones, thereby removing the inconvenience of carrying coupons.

Seventhly, the use of an existing barcode system (by merely replacing an existing barcode scanner with wireless barcode scanners and updating a software module) can implement an effective customer management system at minimum cost.

Eighthly, the present customer management system is applicable to a variety of applications including an electronic ticket.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A customer management system using an LCD barcode displayed on a mobile terminal, comprising:

a wireless barcode scanner for recognizing the LCD barcode corresponding to customer information and commodity information;

a membership manager for managing all matters in membership registration and withdrawal of customers with reference to information stored in a database;

a settlement processor for determining from a membership number of a given one of the customers whether a credit card of the given customer has been authenticated, transferring records containing the membership number of said given customer and the total amount of money to be paid by said given customer to a credit card company associated with the credit card of said given customer upon determining that said credit card has been authenticated, and requesting said credit card company to settle an account for the amount of money to be paid by said given customer;

a purchase information processor for extracting personal information of said given customer and information regarding a commodity or commodities purchased by said given customer from barcode data from said barcode scanner, calculating the price of each of the commodities purchased by said given customer and the total amount of money to be paid by said given customer and transferring the calculated results to components requiring them;

an Internet purchase processor for transferring the personal information of said given customer and said information regarding the commodity or commodities purchased by said given customer to said purchase information processor over the Internet;

a purchase propensity processor for receiving said information regarding the commodity or commodities purchased by said given customer from said purchase information processor, statistically processing the received information and analyzing commodity purchase information of said given customer and his or her purchase propensity or preference for commodities in accordance with the processed results;

said database adapted to store information regarding personal details of the customers, the total amounts of money to be paid by the customers, the purchase propensities or preferences of the customers for commodities, settlement records of the customers, and commodities and coupons to be delivered to the customers; and a network interface for interfacing said components to a communication network.

2. A customer management system using an LCD barcode displayed on a mobile terminal, comprising:

a wireless barcode scanner for recognizing the barcodes corresponding to customer information and commodity information;

a plurality of customer servers for receiving the customer information and commodity information from said barcode scanner, extracting personal details of customers from the received customer information, analyzing commodity purchase information of the customers and their purchase propensities or preferences for commodities, storing the analyzed results and sending the customer information, the commodity purchase information of the customers and information regarding the purchase propensities or preferences of the customers for commodities to a central management server; and said central management server adapted to receive and store said information sent from said customer servers, share information with said customer servers and retrieve desired information from a given one of said customer servers.

3. A customer management system using an LCD barcode displayed on a mobile terminal, as set forth in claim 2, wherein each of said customer servers includes:

a membership manager for managing all matters in membership registration and withdrawal of customers with reference to information stored in a database;

a settlement processor for determining from a membership number of a given one of the customers whether a credit card of the given customer has been authenticated, transferring records containing the membership number of said given customer and the total amount of money to be paid by said given customer to a credit card company associated with the credit card of said given customer upon determining that said credit card has been authenticated, and requesting said credit card company to settle its an account for the amount of money to be paid by said given customer;

a purchase information processor for extracting personal information of said given customer and information regarding a commodity or commodities purchased by said given customer from barcode data from said barcode scanner, calculating the price of each of the commodities purchased by said given customer and the total amount of money to be paid by said given customer and transferring the calculated results to components requiring them;

an Internet purchase processor for transferring the personal information of said given customer and said information regarding the commodity or commodities purchased by said given customer to said purchase information processor over the Internet;

a purchase propensity processor for receiving said information regarding the commodity or commodities purchased by said given customer from said purchase information processor, statistically processing the received information and analyzing commodity purchase information of said given customer and his or her purchase propensity or preference for commodities in accordance with the processed results;

said database adapted to store information regarding personal details of the customers, the total amounts of money to be paid by the customers, the purchase propensities or preferences of the customers for commodities, settlement records of the customers, and commodities and coupons to be delivered to the customers; and a network interface for interfacing said components to a communication network.

4. A customer management method using an LCD barcode displayed on a mobile terminal, comprising the steps of:

a) allowing a user to access a central management server and register as a member of said central management server;

b) allowing a customer server to inquire of said central management server about information regarding said user, containing a barcode number assigned to said user when registering as a member of said central management server, if said user is a new customer, not registered, and then receiving the requested information from said central management server;

c) allowing said customer server to perform customer management operations including a purchase information process and a purchase propensity process, if said user is or becomes a registered customer; and d) allowing said customer server to send purchase records of said user to said central management server.

5. A customer management method using an LCD barcode displayer on a mobile terminal, as set forth in claim 4, wherein said step d) includes the step of allowing said customer server to collect purchase records of customers for a predetermined period of time and send the collected purchase records to said central management server at intervals of the predetermined time period and allowing said customer server and said central management server to exchange other information available for customer management with each other during the night when an associated network is at off-peak hours.

* * * * *

UNITED STATES PATENT AND TRADEMARK OFFICE
CERTIFICATE OF CORRECTION

PATENT NO. : 6,679,421 B2
DATED : January 20, 2004
INVENTOR(S) : Shin et al.

It is certified that error appears in the above-identified patent and that said Letters Patent is hereby corrected as shown below:

Title Page,
Item [57], ABSTRACT,
Line 3, "is simply" should read -- simply --.

Column 10,
Line 52, "its an" should read -- an --.

Signed and Sealed this

Twenty-second Day of June, 2004

JON W. DUDAS
*Acting Director of the United States Patent and Trademark Office*